Patented Apr. 13, 1926.

1,580,500

UNITED STATES PATENT OFFICE.

REINHOLD KUSSEROW, OF OAKLAND, CALIFORNIA.

PROCESS OF MAKING COMPRESSED YEAST.

No Drawing.   Application filed May 8, 1924. Serial No. 711,883.

*To all whom it may concern:*

Be it known that I, REINHOLD KUSSEROW, a citizen of the German Republic, and a resident of Oakland, county of Alameda, State of California, have invented a new and useful Process of Making Compressed Yeast, of which the following is a specification.

The present invention relates to improvements in a process of making compressed yeast from molasses or other sacchariferous products such as cane, beet or corn-sugar, raisin syrup or similar fruit extract and its particular object is to considerably simplify the manufacture and to secure superior products while at the same time allowing a high yield of alcohol to be obtained. It is proposed in the present invention to utilize a method by which the bacteria originally contained in the mashing materials are preserved as contradistinguished from the present method in which molasses and water are both treated either by heat or by the addition of large quantities of acid to destroy all bacteria originally contained therein.

The process of manufacturing compressed yeast from molasses or other sacchariferous substances offers many difficulties. The keeping qualities, the color and the odor of the product are generally inferior to those of grain yeast if prepared by the process employed at the present time. The old methods furthermore involve heavy expenses for heat and labor because the molasses and the water for diluting the same are usually heated in order to sterilize them. All of these expenses will be saved where my process is used since no heat whatever is required and no attempt is made to sterilize either the molasses or the water used for diluting the same.

In my process cold molasses is diluted with cold water to about 20° Balling and acidified. Generally I employ for this purpose $\tfrac{4}{10}$ to $\tfrac{7}{10}$ liters of sulphuric acid to 100 kilos of molasses dependent upon the alkali content of the same. Instead of sulphuric acid I may use any other acid not antiseptic like hydrochloric, phosphoric or any organic acid in a quantity sufficient to acidify the liquid to the same degree, that is, to .5 to 2 ccm. normal sodium hydrate for 100 ccm. of liquid. Molasses of sour reaction needs less acid, that is about $\tfrac{1}{10}$ to $\tfrac{2}{10}$ liters are sufficient for the same quantity. Either before or after acidification a solution of about $\tfrac{1}{10}$ kilo of sodium thio-sulphate or any other thio-sulphate may be added. The diluted liquid is allowed to stand for several hours. If a precipitate has formed the latter is separated from the clear solution in a well known manner by settling or with a filter press. The effect of the acid and the thio-sulphate is to clean the molasses sufficiently biologically and to decolorize the same without requiring any heat.

The solution is further diluted to three to six degrees Balling and the water used for this purpose is preferably cleaned by the addition of an alkali, preferably lime, which may be added in the proportion of approximately $\tfrac{1}{10}$ kilo of lime to every 1000 liters of water. This mixture should be allowed to stand for about one hour.

The usual yeast nutriments, such as ammonia, ammonia compounds, phosphoric acid, phosphates, or organic substances are added to the molasses either before or after the cleaning.

Yeast is added and compressed air introduced into the prepared solution. Yeast and lactic acid bacteria grow together during fermentation because the germs of acid lactric bacteria are contained in the cold molasses. Pure cultures of lactic acid bacteria able to grow in the molasses together with the yeast cells at about 20 to 35° C. may be added if desired. After fermentation the yeast is separated from the liquid and pressed.

The combined method of acidification and fermentation at a low temperature does away with the costly heating and cooling of the large quantities usually involved of molasses and water and bring about as a consequence a corresponding decrease in the time required, in the cost of production and in the outlay and factory equipment.

I claim:

1. The process of preparing a nutrient solution for the manufacture of yeast from molasses containing lactic acid bacteria which consists in diluting the substance with water to approximately 20° B., in adding as acid to the solution sufficient to acidify it without sterilizing the same, in incorporating a thio-sulfate and in adding yeast nutriments while maintaining the solution at ordinary temperatures.

2. The process of preparing a nutrient solution for the manufacture of yeast from molasses containing lactic acid bacteria which consists in diluting the substance with water to approximately 20° B., in adding as acid to the solution sufficient to acidify it in the proportion of about one ccm. normal sodium hydrate to 100 ccm. of liquid without sterilizing the same, in incorporating a thiosulfate and in adding yeast nutriments while maintaining the solution at ordinary temperatures.

REINHOLD KUSSEROW.